June 7, 1960    J. R. PARSONS ET AL    2,939,953
ANALYZER
Filed May 2, 1955    3 Sheets-Sheet 1

INVENTORS.
J. R. PARSONS
W. D. PETERS
BY Hudson & Young
ATTORNEYS

June 7, 1960

J. R. PARSONS ET AL 2,939,953

ANALYZER

Filed May 2, 1955

INVENTORS.
J. R. PARSONS
W. D. PETERS

BY Hudson & Young

ATTORNEYS

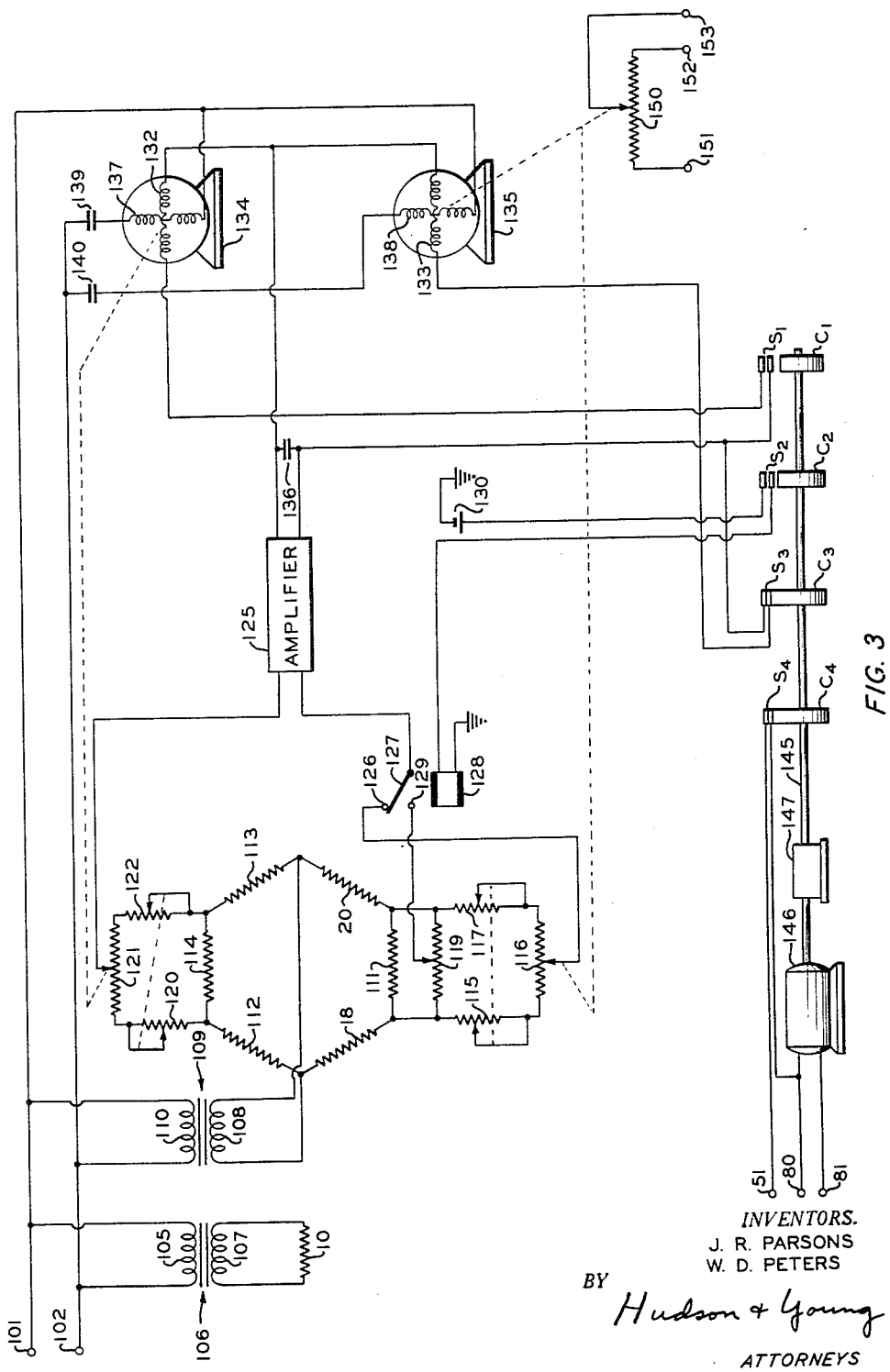

United States Patent Office
2,939,953
Patented June 7, 1960

2,939,953
ANALYZER

James R. Parsons and William D. Peters, Bartlesville, Okla., assignors to Phillips Petroleum Company, a corporation of Delaware Filed May 2, 1955, Ser. No. 505,263

9 Claims. (Cl. 250—43.5)

This invention relates to an analyzer adapted to measure the radiation aborption characteristics of a plurality of fluid streams. In another aspect the invention relates to an improved system for calibrating optical analyzers.

Recording infrared analyzers are known which automatically measure the absorption of infrared radiation by various fluid streams. Such analyzers are of particular value in the petroleum and chemical industries of recording and control purposes wherein a continuous analysis of one or more components in a single fluid stream or a plurality of fluid streams is desired.

Analyzers of this type are described in United States Patent 2,579,825, and in the copending application of J. R. Parsons, Serial No. 299,515, now U.S. Patent No. 2,833,928, filed July 17, 1952. The analyzers described in this patent and in this copending application include means to direct two beams of infrared radiation through a sample cell containing the fluid stream to be analyzed. One of the beams is further directed through filter means which absorbs radiation characteristic of the radiation absorbed by the particular component being detected in the fluid stream. The resulting beams of radiation impinge upon temperature sensitive resistance elements which are connected in an electrical bridge circuit. The output signal of the bridge circuit is transformed to adjust a telemetering potentiometer which transmits a signal to a suitable recording or control instrument. These analyzers are provided with a standardization system whereby periodic adjustments are automatically made to compensate for the effect of factors causing zero drift of the apparatus. Such factors include variations in the temperature of the ambient air, aging of circuit components and fogging of the cell windows. The automatic standardization is accomplished by rebalancing the bridge circuit periodically when the sample cell contains a fluid stream which does not contain the component under analysis. The automatic standardization is effective to minimize zero drift of the instrument.

While such automatic zero standardization has constituted an important advance in the art, problems still exist with respect to the span adjustment of the analyzer. By "span" is meant the separation between the highest and lowest values on the indicating or recording instrument. This is a measure of the sensitivity of the analyzer because the separation between the highest and lowest points is a function of the accuracy to which a particular concentration can be detected. It has been found that variations in span of the analyzer with time and temperature pose a serious problem.

In accordance with the present invention a system is provided to standardize an analyzer periodically and automatically both as to the zero point and the span. This can be accomplished by passing a first standard stream into the analyzer which does not contain any of the component being detected. The electrical bridge circuit of the analyzer is then adjusted so that the output signal is zero. A second standard stream having a known amount of the component being detected is then directed into the instrument. It is preferred that this second standard stream be composed entirely of the component being detected to provide a full scale deflection. The voltage applied to the indicating means is adjusted automatically to provide full scale deflection. However, the analyzer need not be standardized at zero and one-hundred percent. Other appropriate points can be selected if desired. This span standardization can be accomplished by comparing the output signal from the telemetering potentiometer with a reference voltage and adjusting the voltage applied across the end terminals of the potentiometer in response thereto. By the system of the present invention, zero standardization and span standardization are achieved independently without mutual interference. The adjustment of the span does not destroy the validity of the zero standardization.

Accordingly, it is an object of this invention to provide an improved analyzer.

Another object is to provide a system for calibrating an analyzer both as to the zero point and the span sensitivity.

A further object is to provide a system to calibrate the span of an analyzer by passing a fluid stream of known composition through the analyzer periodically.

Other objects, advantages and features of the invention should become apparent from the following detailed description, taken in conjunction with the accompanying drawing, in which:

Figure 3 is a schematic view of an infrared analyzer and the zero standardization system.

Figure 1:
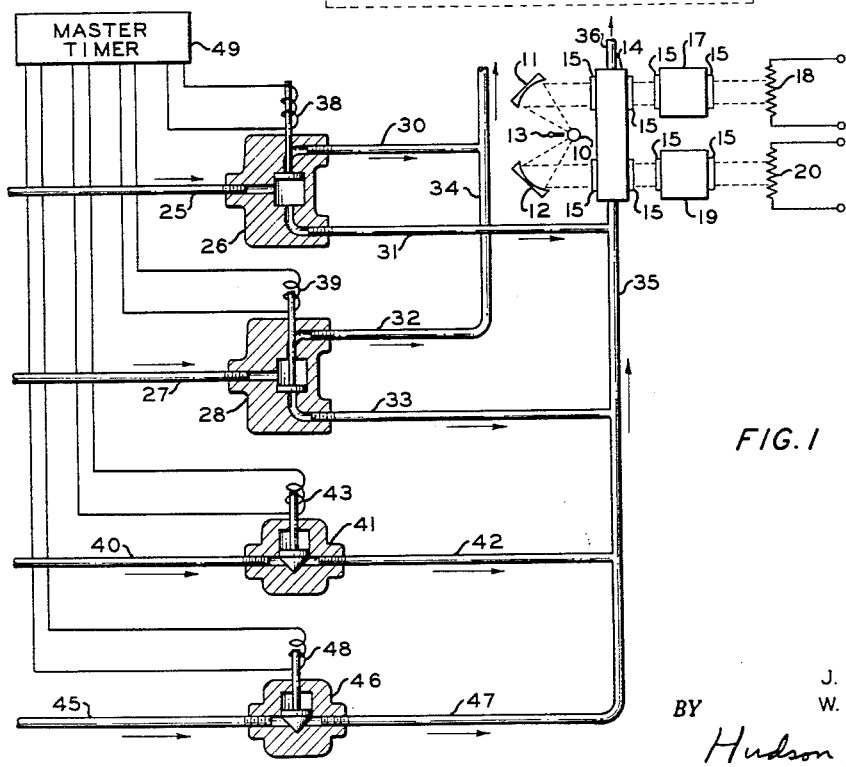
Figure 1 is a schematic view of a valve system to pass a plurality of fluid streams to an analyzer.

Referring now to the drawing in detail, and to Figure 1 in particular, there is shown a source 10 of infrared, or other suitable radiation, from which two beams are directed against a pair of reflectors 11 and 12. A trimmer 13 is positioned so as to be inserted selectively in either of the beams to reduce the amplitude thereof. From reflectors 11 and 12, radiation beams are directed through a sample cell 14 which is provided with radiation transparent windows 15. These windows can be formed of a halide, such as silver chloride, calcium fluoride or sodium fluoride, or from quartz. The first radiation beam is directed from reflector 11 through cell 14 and through a second cell 17 to impinge upon a temperature sensitive resistance element 18. Cell 17 is also provided with transparent windows 15. The second beam of radiation is directed from reflector 12 through cell 14 and through a third cell 19 to impinge upon a second temperature sensitive resistance element 20. Cell 19 is also provided with transparent windows 15. Cell 17 is filled with a material having radiation absorption characteristics the same as those of the component to be analyzed, which material can be a pure sample of the component to be detected. Cell 19 is filled with a material whose radiation absorption characteristics are such as to reduce interference from other components present in the sample stream circulated through cell 14.

For purposes of description, reference will be made to a specific application of the analyzer to determine the concentration of isobutane in first and second sample streams. The first stream contains from approximately 5 to 10 mol percent isobutane and the second sample stream contains approximately 75 mol percent isobutane. The remainder of both sample streams is predominantly normal butane, but may contain small amounts of propane and isopentane. Filter cell 17 is filled with a pure sample of isobutane. Cell 19 is filled with a mixture of 37.5 mol percent normal butane, 37.5 mol percent propane and 25 mol percent isopentane. These amounts of propane and isopentane absorb radiation at wave lengths which may be absorbed by the small amounts of propane and isopentane in the sample stream circulated through cell 14. If these latter components are not present, cell 19 can be filled with a non-absorbing material, such as air.

The first sample stream to be analyzed is supplied to the analyzer from a source, not shown, through a conduit 25 which communicates with the inlet of a valve 26. This sample stream is supplied to the analyzer as a vapor, as are all of the other fluid streams. The second sample stream to be analyzed is supplied from a source, not shown, through a conduit 27 which communicates with the inlet of a second valve 28. Conduits 30 and 31 communicate at their first ends with the respective two outlets of valve 26, and conduits 32 and 33 communicate at their first ends with the respective two outlets of valve 28. Conduits 30 and 32 communicate at their second ends with a vent conduit 34. Conduits 31 and 33 communicate at their second ends with a conduit 35 which in turn communicates with the inlet of sample cell 14. A vent conduit 36 communicates with the outlet of sample cell 14. Valves 26 and 28 are operated by respective solenoids 38 and 39. The sample streams supplied to the two valves are directed to cell 14 when the solenoids associated with the respective valves are energized, and the sample streams are vented when the solenoids are de-energized. As illustrated in Figure 1, solenoid 38 is energized so that the sample stream admitted to the analyzer through conduit 25 is directed through conduits 31 and 35 to sample cell 14.

Figure 2:
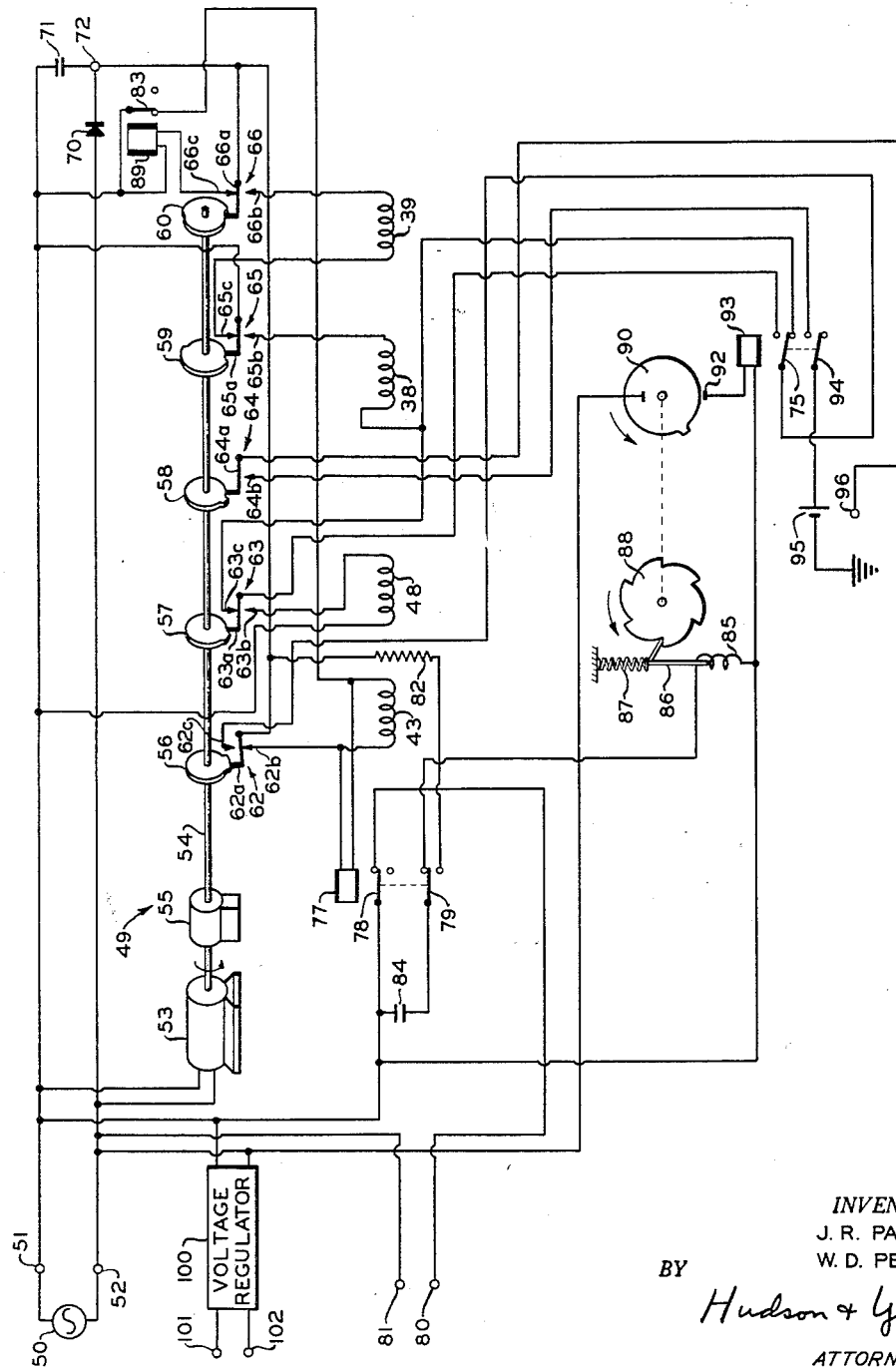
Figure 2 is a schematic view of the valve control timer.

A first standardizing fluid stream is supplied to the analyzer from a source, not shown, through a conduit 40 which communicates with the inlet of valve 41. The fluid stream supplied through conduit 40 is referred to as the "zero" standardizing stream and comprises 100 percent normal butane. The outlet of valve 41 communicates through a conduit 42 with conduit 35. Valve 41 is energized by a solenoid 43 so that the valve is opened when the solenoid is energized. A second standardizing stream is supplied from a source, not shown, through a conduit 45 which communicates with the inlet of a valve 46. This second standardizing stream is referred to as the "span" standardizing stream and comprises 100 percent isobutane. The outlet of valve 46 is connected by a conduit 47 to conduit 35. Valve 46 is operated by a solenoid 48 so that the valve is open when the solenoid is energized. Solenoids 38, 39, 43 and 48 are energized in sequence by a master timer 49 which is illustrated in Figure 2.

Timer 49 is energized by a source of alternating current 50 having output terminals 51 and 52. A constant speed motor 53 is connected to terminals 51 and 52. The drive shaft of motor 53 is connected through a gear box 55 to rotate at a predetermined speed, which can be one revolution per hour, for example. A plurality of cams 56, 57, 58, 58 and 60 is mounted on shaft 54 for rotation therewith. These cams control the operation of respective switches 62, 63, 64, 65 and 66. These switches comprise respective arms 62a, 63a, 64a, 65a, and 66a which engage respective first stationary contacts 62b, 63b, 64b, 65b and 66b when depressed by the respective cams. Switch arms 62a, 63a, 65a, 66a normally engage respective second stationary contacts 62c, 63c, 65c and 66c. The particular shape of the cams and the sequence of operation of the associated switches are described in detail hereinafter.

A rectifier 70 and a capacitor 71 are connected in series relation between terminals 52 and 51. The rectified voltage appearing across capacitor 71 is employed to energize solenoids 38, 39, 43 and 48. When switch arm 65a is depressed, a circuit is completed between terminal 51 and terminal 52 through switch arm 65a, contact 65b, solenoid 38, a switch 75, contact 62c and switch arm 62a, which normally occupies a position in engagement with contact 62c. When switch arm 66a is depressed, a circuit is completed between terminal 72 and terminal 51 through switch arm 66a, contact 66b, solenoid 39, contact 65c and switch arm 65a. When switch arm 62a is depressed, a circuit is completed from terminal 72 to terminal 51 through switch arm 62a, contact 62b, solenoid 43, and a switch 83 which is actuated by a relay 89. When switch arm 63a is depressed, a circuit is completed from terminal 51 to terminal 72 through solenoid 48, contact 63b, switch arm 63a, switch 75 (if closed by relay coil 93), contact 62c and switch arm 62a, which normally occupies a position in engagement with contact 62c. The solenoid operated valves of Figure 1 are thus energized in sequence by timer 49 to pass the fluid streams into sample cell 14.

In normal operation of the analyzer of this invention it has been found desirable to perform a zero standardization approximately once each hour. The span standardization is not needed this often. Satisfactory results have been obtained when the span standardization is performed only once every six hours. The combined standardization cycle can be performed advantageously in approximately 6.25 minutes. This leaves 53.75 minutes in the hour for analysis which can be divided between the two sample streams supplied through respective conduits 25 and 27.

In the illustrated position of Figure 2, the zero standardization is beginning by switch arm 62a being depressed by cam 56. Switch arm 66a is in engagement with contact 66c at this time so that relay 89 is energized to close switch 83. This energizes solenoid 43 to direct the zero standardization stream into cell 14. Solenoids 38, 39, and 48 are deenergized at this time so that only the zero standardization stream is directed into cell 14. The energization of solenoid 43 results in a relay coil 77, which is connected in parallel with solenoid 43, being energized. This closes switches 78 and 79. Closure of switch 78 results in a terminal 80 being connected to terminal 51. A second terminal 81 is connected directly to terminal 52. Terminals 80 and 81 energize a "slave" timer, illustrated in Figure 3, which controls the zero standardization cycle. This operation is described in detail hereinafter. One terminal of switch 79 is connected through a resistor 82 to terminal 72. The arm of switch 79 is connected through a capacitor 84 to terminal 51. Thus, when relay coil 77 is deenergized, capacitor 84 is charged from terminal 72 through resistor 82. A solenoid 85 is connected in parallel with capacitor 84 when switch 79 is operated by relay coil 77 being energized. This results in capacitor 84 being discharged through solenoid 85, which in turn moves a plunger 86 against a retaining spring 87. The movement of plunger 86 imparts rotation to a ratchet wheel 88. Ratchet wheel 88 is rotated 1/6 of a revolution each time plunger 86 is attracted by solenoid 85. Thus, each time the zero standardization cycle is initiated, ratchet wheel 88 is rotated 1/6 of a revolution. A switch 90 is mechanically connected to ratchet wheel 88 for rotation therewith. Switch 90 is connected electrically with terminal 52. Once during each revolution of wheel 88 switch 90 engages a contact 92 which is connected through relay coil 93 to terminal 51. One terminal of a voltage source 95 is connected to ground and the second terminal thereof is connected to the arm of a switch 94. When switch 94 is closed by relay coil 93 being energized, voltage source 95 is connected to contact 64b of switch 64. When switch arm 64a is depressed by cam 58, a circuit is completed to a terminal 96 which operates the span standardization apparatus illustrated in Figure 4.

A voltage regulator 100 is employed to provide a regulated voltage to energize the electrical circuit of the analyzer. The input terminals of voltage regulator 100 are connected to respective terminals 51 and 52 of current source 50. The output terminals 101 and 102 of voltage regulator 100 provide a regulated voltage for the circuit of Figure 3. The primary winding 105 of a transformer 106 is connected across terminals 101 and 102. The end terminals of the secondary winding 107 of transformer 106 are connected to radiation source 10, which can be a coil of wire. Radiation in the infrared spectrum is emitted from source 10 when the wire is heated.

Radiation sensitive elements 18 and 20 are connected in a modified Wheatstone bridge circuit. First end terminals of these elements are connected to the respective end terminals of the secondary winding 108 of a transformer 109. The end terminals of the primary winding 110 of transformer 109 are connected across terminals 101 and 102. A resistor 111 is connected between the second end terminals of elements 18 and 20. The first end terminal of a resistor 112 is connected to the first terminal of element 18, and the first terminal of a resistor 113 is connected to the first terminal of element 20. A resistor 114 is connected between the second terminals of resistors 112 and 113. Resistor 111 is shunted by a unit including a variable resistor 115, a potentiometer 116 and a variable resistor 117, these elements being connected in series relation. A potentiometer 119 has one end terminal connected to the junction between elements 18 and 111 and the second end terminal connected to the junction between elements 20 and 111. Resistor 114 is shunted by a unit which comprises a variable resistor 120, a potentiometer 121 and a variable resistor 122, these elements being connected in series relation.

When a potential is applied across the bridge circuit from transformer 109, potentiometers 116 and 121 can be adjusted so that there is a zero potential difference between the contactors thereof. In like manner, potentiometers 119 and 121 can be adjusted so that there is a zero potential difference between the contactors thereof. The bridge is then balanced so far as the contactors of these potentiometers are concerned. Variable resistors 120 and 122 are connected by a common control shaft so that rotation of the shaft increases the value of one of the resistors and decreases the value of the other. Resistors 120 and 122 can thus be employed as an auxiliary bridge balance control because adjustment thereof increases the resistance on one side of potentiometer 121 while decreasing the resistance on the other side. Variable resistors 115 and 117 are also connected by a common control shaft. However, adjustment of this latter shaft either increases or decreases the resistance of both elements simultaneously. This provides a means of adjusting the sensitivity of the bridge circuit. For example, if the resistance of elements 115 and 117 is high, full scale movement of the contactor of potentiometer 116 produces only a small variation in the balance point of the bridge because of the large resistance in series therewith.

The contactor of potentiometer 121 is connected to the first input terminal of an alternating current amplifier 125. The contactor of potentiometer 116 is connected to a terminal 126 which is engaged by a switch arm 127 in the absence of current being supplied to a relay coil 128. Switch arm 127 is connected to the second input terminal of amplifier 125. The contactor of potentiometer 119 is connected to a terminal 129 which is engaged by switch arm 127 when relay coil 128 is energized. One terminal of relay coil 128 is connected to ground. The second terminal of relay coil 128 is connected to one terminal of a set of contacts $S_2$. The second terminal of contacts $S_2$ is connected to one terminal of a voltage source 130. The second terminal of voltage source 130 is connected to ground. Contacts $S_2$ are closed by rotation of a cam $C_2$ in the manner described hereinafter.

The first output terminal of amplifier 125 is connected to first end terminals of first windings 132 and 133 of respective reversible two-phase motors 134 and 135. The second terminal of motor winding 132 is connected to the first terminal of a second set of contacts $S_1$. The second terminal of contacts $S_1$ is connected to the second output terminal of amplifier 125. A capacitor 136 is connected between the output terminals of amplifier 125 so as to shunt motor winding 132 when contacts $S_1$ are closed by rotation of a cam $C_1$. The second terminal of motor winding 133 is connected to the first terminal of a third set of contacts $S_3$. The second terminal of contacts $S_3$ is connected to the second output terminal of amplifier 125. Contacts $S_3$ are closed by rotation of a third cam $C_3$. One terminal of the second winding 137 of motor 134 is connected to power terminal 101, as is one terminal of the second winding 138 of motor 135. The second terminal of motor winding 137 is connected through a capacitor 139 to power terminal 102. The second terminal of motor winding 138 is connected through a capacitor 140 to power terminal 102.

Cams $C_1$, $C_2$, $C_3$ and a fourth cam $C_4$ are mounted on a shaft 145 for rotation therewith. Shaft 145 is driven by a constant speed motor 146 through reduction gears 147. In one specific example of the operation of this invention, shaft 145 was geared to make one complete revolution in five minutes. Motor 146 is energized from terminals 80 and 81 of Figure 2. Terminal 51 of Figure 2 is also connected to one input terminal of motor 146 through a fourth set of contacts $S_4$ which are closed by cam $C_4$. When relay coil 77 of Figure 2 is energized, current is supplied to motor 146 from terminals 80 and 81. At this time cam $C_4$ is out of engagement with contacts $S_4$. However, cam $C_4$ soon rotates to complete the circuit through contacts $S_4$ so that motor 146 remains energized from terminals 51 and 81 even after relay coil 77 is deenergized. Contacts $S_4$ are opened at the end of one complete revolution of motor 146. Contacts $S_3$, $S_2$ and $S_1$ are closed in the manner described hereinafter in detail.

The analyzer is adjusted initially by passing the zero standardizing fluid into sample cell 14 from conduit 40. This zero standardizing stream does not contain isobutane so that the radiation transmitted to element 20 is a maximum. The radiation transmitted to element 18 is less than the radiation transmitted to element 20 because of the infrared absorption by the isobutane in cell 17. The contactor of potentiometer 121 is then set at a predetermined point, such as near the middle of the scale. Contacts $S_3$ are closed so that motor 135 is connected to the output of amplifier 125. Relay coil 128 is deenergized. Potentiometers 120 and 122 are adjusted until the output signal is zero. This signal is a function of the position of the drive shaft of motor 135 and is provided by the apparatus of Figure 4 which is described in detail hereinafter. Relay coil 128 is then energized so that the contactor of potentiometer 119 is connected to the second input terminal of amplifier 125. Contacts $S_1$ are closed so that motor 134 is energized by the output of amplifier 125. The contactor of potentiometer 119 is adjusted manually as necessary so that motor 134 drives the contactor of potentiometer 121 to the predetermined initial position.

In normal operation of the analyzer, relay coil 128 is deenergized so that the contactor of potentiometer 116 is connected to the input of amplifier 125. Contacts $S_3$ are closed so that motor 135 is driven by the output of amplifier 125. This motor adjusts the position of contactor 116 until there is a zero potential difference between the contactors of potentiometers 121 and 116. The movement of the contactor of potentiometer 116 necessary to secure this balance is a measurement of the amount of isobutane present in sample cell 14. Whenever isobutane is present in cell 14 the radiation incident upon element 20 is decreased due to the absorption by the isobutane. Any change in resistance of element 20 tends to unbalance the bridge circuit. The position of the contactor of potentiometer 116 is indicated by a telemetering potentiometer 150. The contactor of potentiometer 150 is mechanically connected to the drive shaft of motor 135. The end terminals 151 and 152 of potentiometer 150 are connected to a voltage source shown in Figure 4. The contactor of potentiometer 150 is connected to a terminal 153. The voltage between terminal 153 and one of the end terminals of potentiometer 150 is a measurement of the position of the contactor of potentiometer 116.

Figure 4:
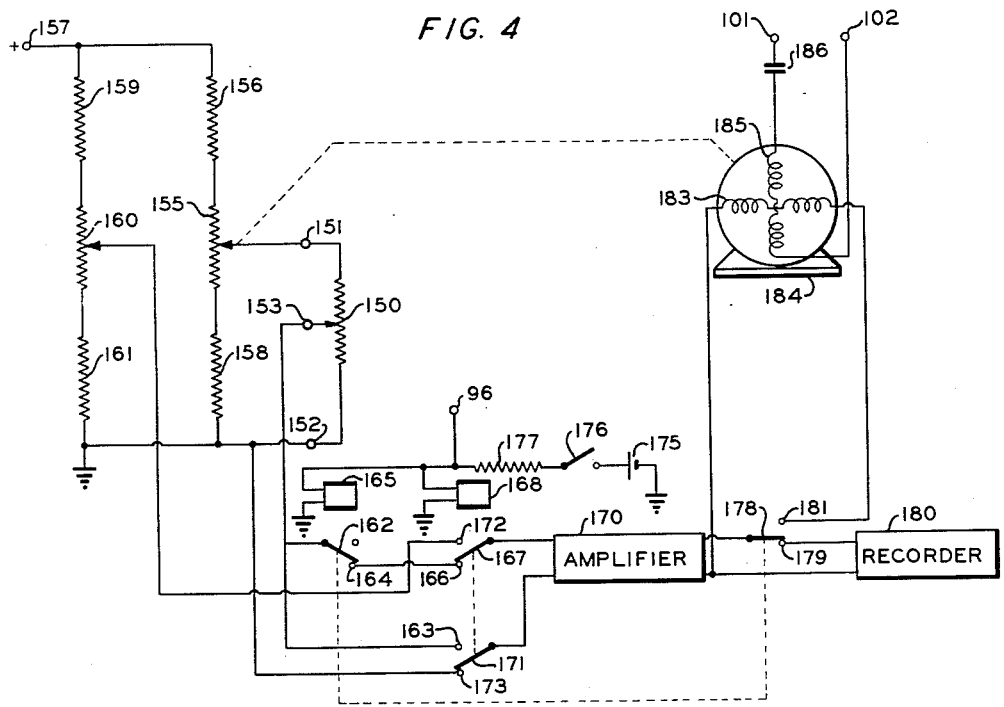
Figure 4 is a schematic view of the span standardization system.

The indicating and span standardizing circuit is illustrated in Figure 4. End terminal 152 of potentiometer 150 is connected to ground. End terminal 151 of potentiometer 150 is connected to the contactor of a potentiometer 155. The first end terminal of potentiometer 155 is connected through a resistor 156 to a positive potential terminal 157. The second end terminal of potentiometer 155 is connected through a resistor 158 to ground. The first terminal of a resistor 159 is connected to potential terminal 157. The second terminal of resistor 159 is connected to the first end terminal of a potentiometer 160. The second end terminal of a potentiometer 160 is connected through a resistor 161 to ground. The contactor of potentiometer 150 is connected to a switch arm 162 and to a switch terminal 163. Switch arm 162 engages a terminal 164 in the absence of current being supplied to a relay coil 165. Terminal 164 is connected to a switch terminal 166 which is engaged by a switch arm 167 in the absence of current being supplied to a relay coil 168. Switch arm 167 is connected to the first input terminal of a servo amplifier 170. Terminal 163 is engaged by a switch arm 171 when relay coil 168 is energized. Switch arm 171 is connected to the second input terminal of amplifier 170. The contactor of potentiometer 160 is connected to a terminal 172 which is engaged by a switch arm 167 when relay coil 168 is energized. A grounded terminal 173 is engaged by switch arm 171 in the absence of current being supplied to relay coil 168. First terminals of relay coils 165 and 168 are connected to ground. Second terminals of these coils are connected to terminal 96 of Figure 2 which is connected to voltage source 95 through switches 64 and 94, as previously described. Relay coils 165 and 168 can also be energized from a current source 175. One terminal of current source 175 is connected to ground. The second terminal of current source 175 is connected through a switch 176 and a resistor 177 to the second terminals of relay coils 165 and 168.

The input circuit of amplifier 170 is provided with a converter to change direct current signals into corresponding alternating current signals. The first output terminal of amplifier 170 is connected to a switch arm 178. In the absence of current being supplied to relay coil 165, switch arm 178 engages a contact 179 which is connected to the first input terminal of a voltage recorder 180. The second output terminal of amplifier 170 is connected to the second input terminal of recorder 180. Recorder 180 can be a self-balancing instrument. When current is supplied to relay coil 165, switch arm 178 engages a contact 181 which is connected to one terminal of the first winding 183 of a reversible two-phase motor 184. The second terminal of winding 183 is connected to the second output terminal of amplifier 170. One terminal of the second winding 185 of motor 184 is connected to one terminal of a capacitor 186. The second terminal of winding 185 and the second terminal of capacitor 186 are connected to respective terminals 101 and 102 of voltage regulator 100.

In order to calibrate the analyzer for full scale deflection of recorder 180, the span standardizing stream comprising 100 percent isobutane is directed through cell 14 from inlet conduit 45. This stream results in maximum absorption of radiation from the beam impinging upon element 20. It is desired that the instrument be calibrated so that the reading of recorder 180 indicates 100 percent isobutane in sample cell 14. This is provided by adjusting potentiometer 155 manually to vary the voltage applied across the end terminals of potentiometer 150 until recorder 180 indicates 100 percent isobutane. Relay coils 165 and 168 are deenergized at this time. Switch 176 is then closed to energize relay coils 165 and 168. This connects the input terminals of amplifier 170 to the contactors of respective potentiometers 150 and 160. The output terminals of amplifier 170 are connected to motor 184. The contactor of potentiometer 160 is then adjusted manually until motor 184 moves the contactor of potentiometer 155 to its previous position.

During the span standardization cycle which occurs periodically during normal operation of the analyzer, relay coils 165 and 168 are energized by closure of switches 94 and 64 in Figure 2. This results in the output signal from amplifier 170 being applied to reversible motor 184. Amplifier 170 compares the potentials at the contactors of potentiometers 150 and 160. If any potential difference exists, motor 184 adjusts the contactor of potentiometer 155 to vary the magnitude of potential applied across the end terminals of potentiometer 150. This potential is adjusted until the two measured voltages are equal, at which time recorder 180 indicates 100 percent isobutane in sample cell 14.

The complete operation of the analyzer is summarized in the following table:

| Step | Stream | Time Interval, minutes | Cam Switch Position | | | | | Contact Set | | | |
|---|---|---|---|---|---|---|---|---|---|---|---|
| | | | 62a | 63a | 64a | 65a | 66a | S₁ | S₂ | S₃ | S₄ |
| 1 | 40 | 0 to 0.07 | down | up | up | up | up | open | open | closed | open. |
| 2 | 40 | 0.07 to 1.25 | down | up | up | up | up | open | open | open | closed. |
| 3 | 40 | 1.25 to 1.67 | down | up | up | up | up | open | closed | open | closed. |
| 4 | 40 | 1.67 to 2.50 | down | up | up | up | up | closed | closed | open | closed. |
| 5 | 40 | 2.50 to 2.92 | down | down | up | up | up | open | closed | open | closed. |
| 6 | 40 | 2.92 to 3.25 | down | down | up | down | up | open | open | open | closed. |
| 7 | 45 | 3.25 to 4.93 | up | down | up | down | up | open | open | open | closed. |
| 8 | 45 | 4.93 to 5.00 | up | down | up | down | up | open | open | closed | closed. |
| 9 | 45 | 5.00 to 5.25 | up | down | up | down | up | open | open | closed | open. |
| 10 | 45 | 5.25 to 5.75 | up | down | down | down | up | open | open | closed | open. |
| 11 | 45 | 5.75 to 6.25 | up | down | up | down | up | open | open | closed | open. |
| 12 | 25 | 6.25 to 33.00 | up | up | up | down | up | open | open | closed | open. |
| 13 | 27 | 33.00 to 60.00 | up | up | up | up | down | open | open | closed | open. |

The numbers under the head entitled, "Stream," refer to the inlet conduit of Figure 1 which is in communication with sample cell 14. The complete cycle described in the table occupies one hour.

With reference to Figure 2, it is assumed that timer 49 is positioned so that the standardization cycle is beginning. Step No. 1 occupies the first 0.07 minute. During this time the cam switches are in the designated positions so that solenoid 43 is energized to transmit the zero standardizing fluid of conduit 40 to sample cell 14. Contacts S₃ of Figure 3 are still closed from the previous analysis. During Step No. 2 contacts S₃ are opened to disconnect motor 135 from the output of amplifier 125. At the same time contacts S₄ are closed to keep timing motor 146 energized during the complete zero standardization cycle.

During Step No. 3 contacts S₂ are closed so that potentiometer 116 is disconnected from amplifier 125 and potentiometer 119 is connected to the amplifier in place thereof. This is accomplished by relay coil 128 being energized. During Step No. 4 contacts S₁ are closed so that motor 134 is connected to the output of amplifier 125. This motor rotates to adjust the position of the contactor of potentiometer 121 until the bridge circuit is balanced as indicated by a zero input signal being applied to amplifier 125. During Step No. 5 switch arm 63a engages contact 63b so that solenoid 48 becomes energized as soon as switch arm 62a moves upwardly to engage contact 62c. It is assumed that switch 90 is rotated at this time to complete contact with terminal 92 to energize relay coil 93 to close switches 75 and 94. As previously mentioned, this operation takes place during every sixth cycle of master timer 49. During Step No. 5 contacts $S_1$ are open to disengage motor 134 from amplifier 125. This effectively terminates the actual standardization period. During Step No. 6 switch arm 65a moves downwardly to engage contact 65b. This places solenoid 38 in a position to be energized as soon as switch arm 63a moves upwardly to engage contact 63c.

During Step No. 7 switch arm 62a moves upwardly to engage contact 62c. This deenergizes solenoid 43 and energizes solenoid 48. Valve 41 of Figure 1 is closed and valve 46 is opened so that the span standardization fluid from conduit 45 is circulated through sample cell 14. During Step No. 8 contacts $S_3$ are closed to connect balance motor 135 to the output of amplifier 125. This prepares motor 135 for normal operation of the analyzer following the standardization cycle. During Step No. 9 contacts $S_4$ are opened to terminate rotation of motor 146. This completes the zero standardization cycle. Motor 146 remains deenergized until the beginning of the following zero standardization cycle which occurs 55 minutes later.

During Step No. 10 switch arm 64a moves downwardly to engage contact 64b. This results in relay coils 165 and 168 of Figure 4 being energized so that motor 184 is connected to the output of amplifier 170. The contactors of potentiometers 150 and 160 are connected to the respective input terminals of amplifier 170. The span standardization thus takes place during Step No. 10 with motor 184 adjusting the contactor of potentiometer 155 as necessary to establish the 100 percent point on recorder 180. During Step No. 11 switch arm 64a moves upwardly out of contact with contact 64b so that relay coils 165 and 168 are deenergized. This completes the actual span standardization cycle.

During Step No. 12 switch arm 63a moves upwardly out of engagement with contact 63b so that solenoid 48 is deenergized. Solenoid 38 immediately becomes energized so that the sample stream from conduit 25 is circulated through sample cell 14. Switch arm 66a moves downwardly to engage contact 66b. Step No. 12 continues approximately 26.75 minutes and represents the analysis of the first sample stream. During Step No. 13 switch arm 65a moves upwardly so that solenoid 39 is energized and solenoid 38 is deenergized. This passes the sample stream from conduit 27 to sample cell 14 in place of the sample stream supplied by conduit 25. Step No. 13 continues for approximately 27 minutes and represents the remainder of the cycle. Step No. 1 then repeats.

During the following five cycles of master timer 49, relay coil 93 remains deenergized so that the span standardization sample is not transmitted into sample cell 14. Under this condition the sample stream from conduit 25 enters sample cell 14 at the beginning of Step 10. This has the effect of lengthening the analysis period for the first sample stream by 1.25 minutes.

Obviously, the times and specific fluid components mentioned herein are for purposes of description and should not be considered as limiting the invention. While the invention has been described in conjunction with a present preferred embodiment, it is not limited thereto.

What is claimed is:

1. Analyzing apparatus comprising a sample cell, means to direct a first fluid stream to be analyzed therethrough, means to direct a second fluid stream of predetermined composition through said sample cell, means to direct a third fluid stream of predetermined composition through said sample cell, switching means to direct said three sample streams selectively through said cell, means to transmit a beam of radiation through said cell, a potentiometer, a voltage source applied across said potentiometer, means to provide an electrical signal representative of the radiation transmitted through said cell, means connected to said switching means to adjust said means to provide so that said signal is of predetermined magnitude when said third stream is directed to said cell, first means to adjust the position of the contactor of said potentiometer in response to said signal, means to indicate the position of the contactor of said potentiometer, second means to adjust the magnitude of said voltage source applied across said potentiometer in response to said signal, and means connected to said switching means to apply said signal to said first means when said first stream is directed through said cell and to apply said signal to said second means when said second stream is directed through said cell.

2. Analyzing apparatus comprising a sample cell, means to direct a first fluid to be analyzed for a first component therethrough, means to direct a second fluid stream comprising one hundred percent of said first component through said cell, means to direct a third fluid stream comprising zero percent of said first component through said cell, switching means to direct said three sample streams through said cell in preselected sequence, means to transmit a beam of radiation through said cell, a potentiometer, a voltage source applied across said potentiometer, means to provide an electrical signal representative of the radiation transmitted through said cell, means connected to said switching means to adjust said means to provide so that said signal is of predetermined magnitude when said third stream is directed to said cell, first means to adjust the position of the contactor of said potentiometer in response to said signal, means to indicate the position of the contactor of said potentiometer, second means to adjust the magnitude of said voltage source applied across said potentiometer in response to said signal, and means connected to said switching means to apply said signal to said first means when said first stream is directed through said cell and to apply said signal to said second means when said second stream is directed through said cell.

3. Analyzing apparatus comprising a sample cell, a source of radiation, first and second radiation sensitive impedance elements, means to direct a first beam of radiation from said source through said cell to impinge on said first element, means to direct a second beam of radiation through said cell to impinge on said second element, radiation filter means positioned in said first beam, an electrical bridge network including said first and second elements, a current source connected between first opposite terminals of said network, output terminals forming second opposite terminals of said network so that the potential difference across said output terminal is representative of the difference in radiation impinging upon said first and second elements, means to direct a first stream to be analyzed through said cell, means to direct a second fluid stream of predetermined composition through said cell, means to direct a third fluid stream of predetermined composition through said cell, switching means to direct said three streams selectively through said cell, a potentiometer, a voltage source applied across said potentiometer, first means controlled by said switching means to adjust the relative impedances of elements in said bridge network responsive to a potential difference across said output terminals to reduce the potential across said output terminals to zero when said first fluid stream is circulated through said cell, means to adjust the contactor of said potentiometer responsive to said first means, second means controlled by said switching means to adjust the relative impedances of elements in said bridge network responsive to a potential difference across said output terminals to reduce the potential across said output terminals to zero when said second fluid stream is circulated through said cell, third means controlled by said switching means to adjust the voltage applied across said potentiometer responsive to a potential difference across said output terminals when said third fluid stream is circulated through said cell, and means to indicate the position of the contactor of said potentiometer.

4. The combination in accordance with claim 3 wherein said source of radiation provides radiation in the infrared spectrum, and said first and second elements are temperature sensitive resistance elements.

5. The combination in accordance with claim 3 wherein said first, second and third means each comprises an electric motor adapted to rotate in a first direction when the potential applied thereto from said output terminals is of a first polarity and is adapted to rotate in a second direction when the potential applied thereto from said output terminals is of a second polarity.

6. The combination in accordance with claim 3 wherein said switching means passes said first, second and third sample streams sequentially and repetitively through said cell.

7. The combination in accordance with claim 3 wherein said switching means passes said first and second sample streams sequentially and repetitively through said cell, a single sequence of a first and second sample stream comprising a cycle, said second sample stream being passed through said cell a minor portion of each cycle, and said third sample stream is passed through said cell periodically, said third sample stream being so passed during a portion of one of a plurality of said cycles.

8. Analyzing apparatus comprising a sample cell, a source of radiation, first and second radiation sensitive impedance elements, means to direct a first beam of radiation from said source through said cell to impinge on said first element, means to direct a second beam of radiation through said cell to impinge on said second element, radiation filter means positioned in said first beam, an electrical bridge network including said first and second elements, a current source connected between first opposite terminal of said network, output terminals forming second opposite terminals of said network so that the potential difference across said output terminals is representative of the difference in radiation impinging upon said first and second elements, means to direct a first fluid stream to be analyzed through said cell, means to direct a second fluid stream of predetermined composition through said cell, switching means to direct said two streams selectively through said cell, a potentiometer, a voltage source applied across said potentiometer, first means controlled by said switching means to adjust the relative impedances of elements in said bridge network responsive to a potential difference across said output terminals to reduce the potential across said output terminals to zero when said first fluid stream is circulated through said cell, means to adjust the contactor of said potentiometer responsive to said first means, second means controlled by said switching means to adjust the voltage applied across said potentiometer responsive to a potential difference across said output terminals when said second fluid stream is circulated through said cell, and means to indicate the position of the contactor of said potentiometer.

9. Analyzing apparatus comprising a sample cell, a source of radiation, first and second radiation sensitive impedance elements, means to direct a first beam of radiation from said source through said cell to impinge on said first element, means to direct a second beam of radiation through said cell to impinge on said second element, radiation filter means positioned in said first beam, an electrical bridge network including said first and second elements, a current source connected between first opposite terminal of said network, output terminals forming second opposite terminals of said network so that the potential difference across said output terminals is representative of the difference in radiation impinging upon said first and second elements, means to direct a plurality of first fluid streams to be analyzed through said cell, means to direct a second fluid stream of predetermined composition through said cell, means to direct a third fluid stream of predetermined composition through said cell, switching means to direct said streams selectively through said cell, a potentiometer, a voltage source applied across said potentiometer, first means controlled by said switching means to adjust the relative impedances of elements in said bridge network responsive to a potential difference across said output terminals to reduce the potential across said output terminals to zero when one of said fluid streams are circulated through said cell, means to adjust the contactor if said potentiometer responsive to said first means, second means controlled by said switching means to adjust the relative impedances of elements in said bridge network responsive to a potential difference across said output terminals to reduce the potential across said output terminals to zero when said second fluid stream is circulated through said cell, third means controlled by said switching means to adjust the voltage applied across said potentiometer responsive to a potential difference across said output terminals when said third fluid stream is circulated through said cell, and means to indicate the position of the contactor of said potentiometer.

References Cited in the file of this patent

UNITED STATES PATENTS

| 2,180,035 | Cleghorn | Nov. 14, 1939 |
| 2,435,366 | Richie | Feb. 3, 1948 |
| 2,577,735 | Broomell | Dec. 11, 1951 |
| 2,579,825 | Hutchins | Dec. 25, 1951 |
| 2,621,298 | Wilde et al. | Dec. 9, 1952 |
| 2,721,942 | Friel et al. | Oct. 25, 1955 |
| 2,756,342 | Miller | July 24, 1956 |
| 2,789,230 | Hutchins | Apr. 16, 1957 |
| 2,792,501 | Barton | May 14, 1957 |

UNITED STATES PATENT OFFICE

CERTIFICATE OF CORRECTION

Patent No. 2,939,953                                                 June 7, 1960

James R. Parsons et al.

It is hereby certified that error appears in the printed specification of the above numbered patent requiring correction and that the said Letters Patent should read as corrected below.

Column 12, line 33, for "said fluid" read -- said first fluid --; line 34, for "contactor if" read -- contactor of --.

Signed and sealed this 29th day of November 1960.

(SEAL)
Attest:

KARL H. AXLINE
Attesting Officer

ROBERT C. WATSON
Commissioner of Patents